United States Patent [19]

Akiike

[11] Patent Number: 5,059,992
[45] Date of Patent: Oct. 22, 1991

[54] DRIVE DEVICE FOR MOTOR

[75] Inventor: Michihiro Akiike, Kanagawa, Japan

[73] Assignee: Canon Kabushiki Kaisha, Tokyo, Japan

[21] Appl. No.: 602,645

[22] Filed: Oct. 24, 1990

[30] Foreign Application Priority Data

Oct. 27, 1989 [JP] Japan .................................. 1-278439

[51] Int. Cl.⁵ .......................... G03B 3/10; G03B 9/02; H03K 17/687
[52] U.S. Cl. ................................ 354/195.1; 307/571; 388/907; 354/271.1
[58] Field of Search .......................... 354/195.1, 271.1; 388/907, 917; 307/571, 139, 140

[56] References Cited

U.S. PATENT DOCUMENTS

Re. 32,526  10/1987  Hochstein ........................... 307/571
3,412,266  11/1968  Tarico ................................. 307/571

*Primary Examiner*—Michael L. Gellner
*Attorney, Agent, or Firm*—Fitzpatrick, Cella, Harper & Scinto

[57] ABSTRACT

In a motor control device, an electric circuit responsive to a mode selection signal for determining whether or not an electric motor is driven is constructed with two field-effect transistors. A source terminal of the first field-effect transistor is connected to one of terminals of the motor, and a source terminal of the second field-effect transistor is connected to the other terminal of the motor. The mode selection signal is applied to the gate terminal of each of the two field-effect transistors. The drain terminal of the first field-effect transistor is connected to the output of a circuit for generating a drive signal for driving the motor, and the drain terminal of the second field-effect transistor is grounded. The accuracy of control is not lowered as the number of cycles of changing operation over between the manual and motor-driven modes increases, and the electric power is less consumed in each cycle over.

5 Claims, 3 Drawing Sheets

DRIVE DEVICE FOR MOTOR

BACKGROUND OF THE INVENTION

1. Field of the Invention

This invention relates to drive devices for moving a lens, diaphragm, etc. in the photographic lens and, more particularly, to drive control devices suited to operate this lens, diaphragm, etc. with selection of the manual and motor-driven modes.

2. Description of the Related Art

The conventional circuit for selectively operating the manual and motor-driven modes of the apparatus of this kind has been constructed in the form as shown in FIG. 4. That is, a motor-drive/manual changeover signal coming through a signal line 8 enters an amplifier 12 and goes therefrom to a relay 14, thereby opening or closing a contact point 14a of the relay 14. Thus, changing over between these modes becomes possible.

Describing it in more detail, when the operator chooses the manual mode, the motor-drive/manual changeover signal functions, with the help of the amplifier 12, to set the relay 14 to the open state, so that the motor 5 is cut off from the supply of the motor-drive command signal from another signal line 1 through another amplifier 2. By this, direct driving of the lens by hand becomes possible. Meanwhile, in the motor-driven mode, the motor-drive/manual changeover signal coming through the amplifier 12 closes the contact point of the relay 14 so that the motor 5 and the amplifier 2 are connected to each other. Responsive to the motor-drive command signal, the motor 5 is driven to move the lens.

However, the above-described conventional example, because of its using the method of changing over between the motor-driven and manual modes by opening or closing the contacts of the relay 14, has the following problems:

1) Owing to the relay operation, consumption of electrical energy in an electric power source 13 becomes large. For the electric power source of the lens of the portable camera for home use, batteries are used in many cases. However, the increase of electric current consumption by the relay operation shortens the photographic time. This may cause a precious shutter opportunity to be lost.

2) Because of the contact operation, reliability is low and cost is high. In general, the relay contacts have an endurance span. After a certain time of use, therefore, the relay must be exchanged by a fresh one. The maintenance of this sort is very troublesome, too.

SUMMARY OF THE INVENTION

An object of the invention is to eliminate the above-described problems and to provide a motor drive device which can achieve an increase of the reliability of the changing-over operation between the manual and motor-driven modes, a reduction of the consumed electric power to carry out the changing-over operation, and a lowering of the production cost.

In a preferred embodiment, a circuit for changing over a signal is constructed with two field-effect transistors. The source terminal of one of the field-effect transistors is connected to one terminal of the motor, and the source terminal of the other field-effect transistor is connected to the other terminal of the motor. To the gate terminal of each of the field-effect transistors, a signal is applied from a circuit for producing a changeover signal. Further, to the drain terminal of one of the field-effect transistors, a drive signal for driving the motor is inputted. The drain terminal of the other field-effect transistor is grounded. Thus, the motor control device has advantages that the number of times the changing-over operation between the manual and motor-driven modes is repeated does not cause the precision to lower and that the electric power is less consumed.

DETAILED DESCRIPTION OF THE PREFERRED EMBODIMENTS

Figure 1:
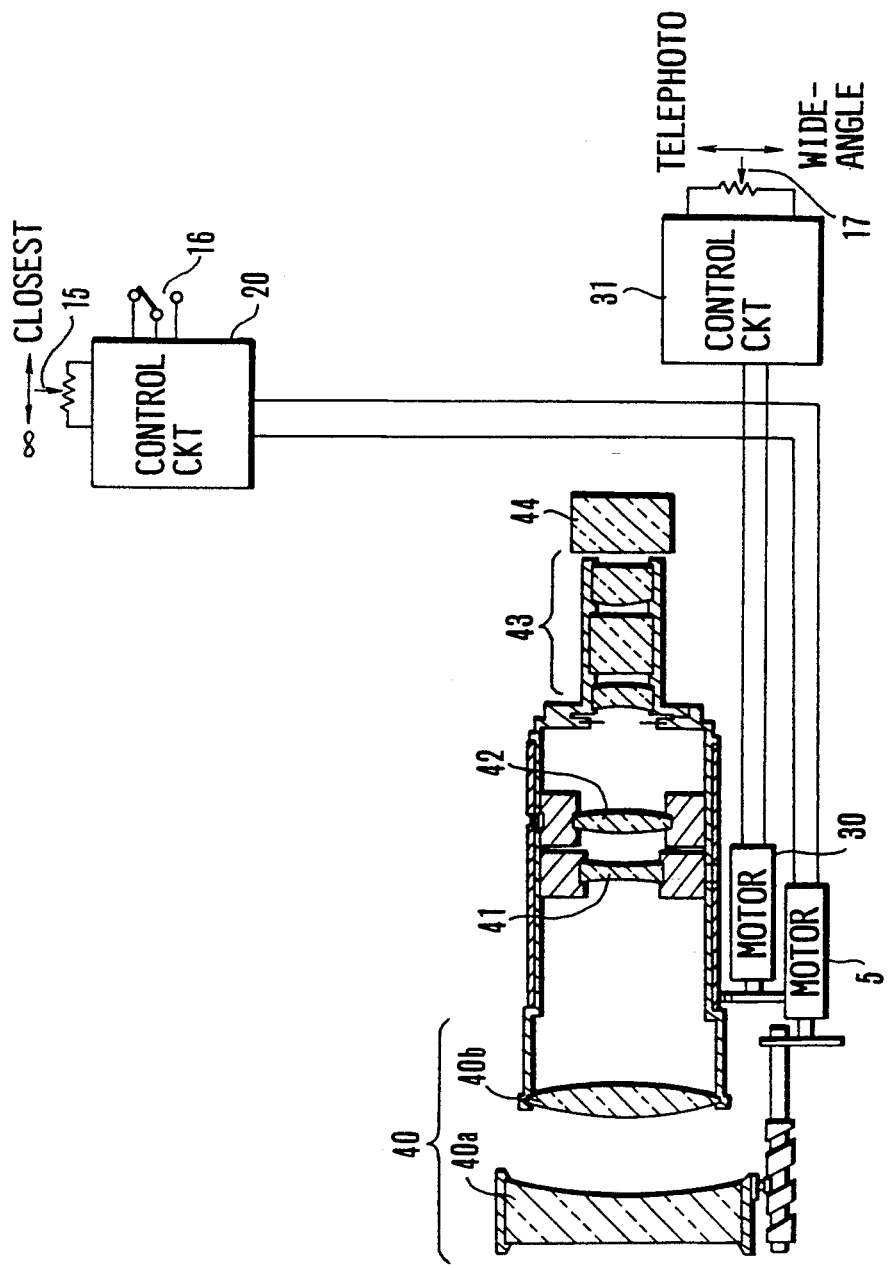
FIG. 1 is a block diagram of a motor control device according to the invention as applied to the lens movement of the photographic lens.

FIG. 1 schematically shows a photographic lens and its operating system according to the invention. A first lens group 40 includes a lens unit 40a which moves along an optical axis when focusing. A variator lens group 41, a compensator lens group 42, a relay lens group 43 and a color separation optical system 44 are arranged in this order from the front. An electric motor 5 is arranged to move the focusing lens unit 40a. A control circuit 20 is constructed in the form of an electronic circuit to be described later. A member 15 for producing a command signal for the focusing lens is constructed in the form of, for example, a potentiometer. Whether focusing is carried out manually or by the motor 5 is determined by a changeover means 16. Another electric motor 30 for zooming is operatively connected to a rotatable sleeve having camming slots formed therein as publicly known, so that the variator lens group 41 and the compensator lens group 42 move along the optical axis as guided by the predetermined optical loci. Another member 17, for example, potentiometer, produces a zoom command signal. Another control circuit 31 drives the motor 30.

Figure 2:
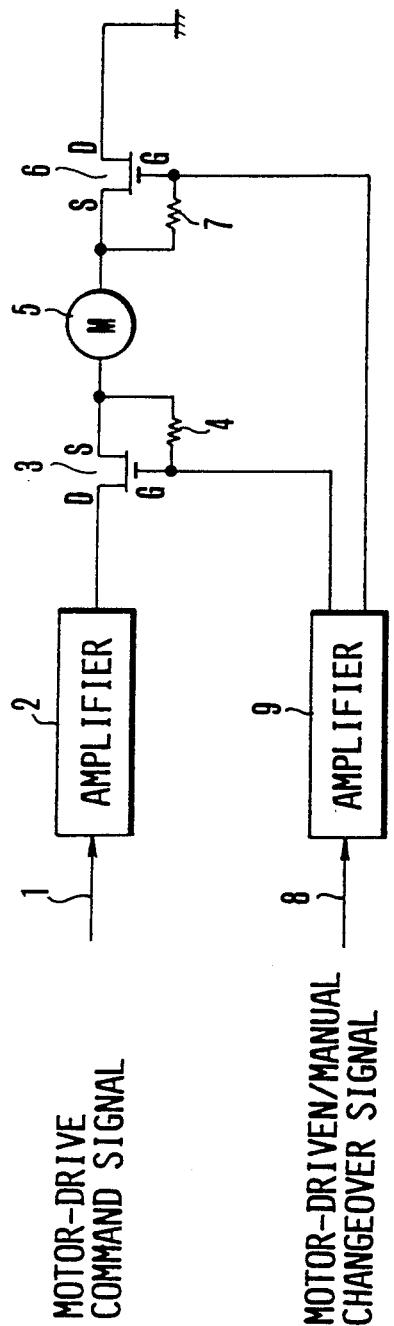
FIG. 2 is an electric circuit diagram illustrating an embodiment of the invention.
Figure 4:
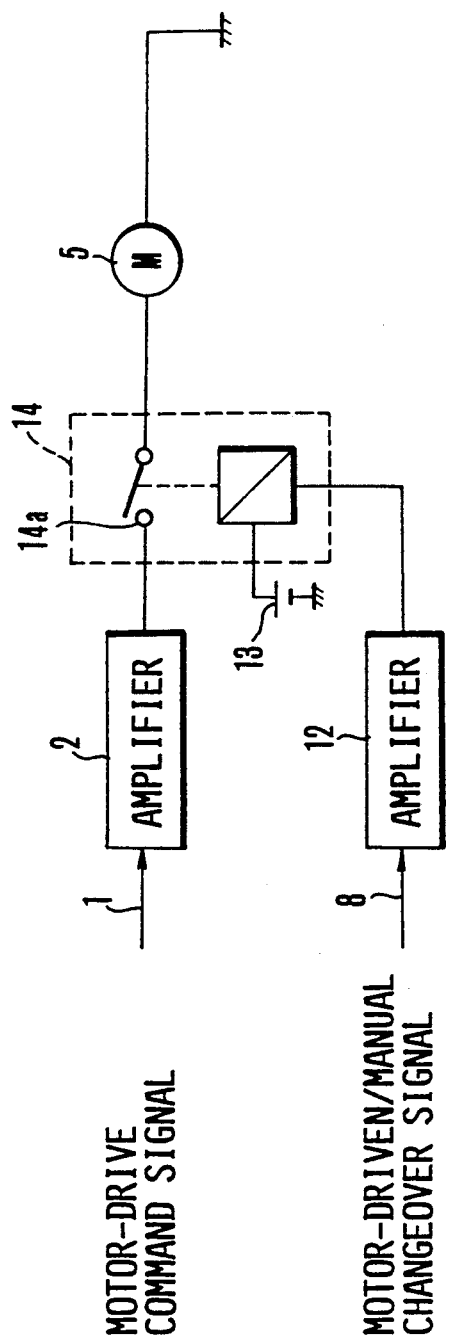
FIG. 4 is an electric circuit diagram illustrating the construction of the conventional device.

Next, by reference to FIG. 2, the construction of the above-cited control circuit 20 is described. Incidentally, the control circuit 20 is equivalent to what is denoted by reference numerals 2, 9, 3, 4, 6 and 7 to be described below. In FIG. 2, the same parts as those shown in FIG. 4 are denoted by the same reference numerals.

Referring to FIG. 2, a field-effect transistor (FET) 3 has its D terminal (drain terminal) receive the motor-drive command signal from the operating member 15 after amplification by the amplifier 2, and its G terminal (gate terminal) receive the motor-driven/manual changeover signal after amplification by the amplifier 9. Its S terminal (source terminal) is connected to one of terminals of the motor 5. A resistor 4 is connected between the G terminal and the S terminal of the aforesaid field-effect transistor 3. Another field-effect transistor 6 has its G terminal receive the motor-driven/manual changeover signal after amplification by the amplifier 9. Its S terminal is connected to the other terminal of the aforesaid motor 5 and its D terminal is grounded. A resistor 7 is connected between the S terminal and the G terminal of the aforesaid field-effect transistor 6.

The circuit of such a construction operates as follows: In the motor-driven mode, the motor 5 is driven. For this purpose, the motor-drive command signal after amplification by the amplifier 2 is given to the D terminal of the field-effect transistor 3. At this time, both the field-effect transistors 3 and 6 are being set in their short-circuit (ON) states by the motor-driven/manual changeover signal supplied from the amplifier 9. Hence, the aforesaid motor-drive command signal is supplied to the motor 5, and a driving control of the focusing lens unit 40a by that signal becomes possible.

Meanwhile, in the manual mode, the aforesaid field-effect transistors 3 and 6 are set to their open (OFF) states by the motor-driven/manual changeover signal supplied from the amplifier 9. Therefore, the output side of the motor 5, namely, the distance adjusting ring of the lens barrel, is able to be manipulated for the purpose of operating the focusing lens. Again, though, at this time, the motor 5 generates the reverse voltage by the counter electromotive force, no problem arises because the field-effect transistors 3 and 6 are set in the open state by the resistors 4 and 7.

Figure 3:
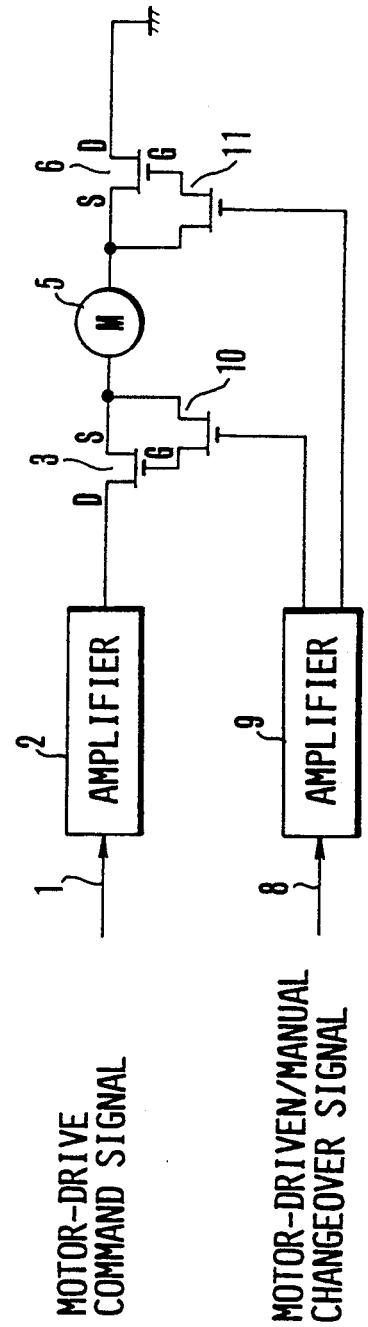
FIG. 3 is an electric circuit diagram illustrating another embodiment of the invention.

FIG. 3 shows another embodiment of the invention, where the reverse voltage generation preventing elements or the resistors 4 and 7 of FIG. 2 are replaced by field-effect transistors 10 and 11 respectively.

As to the operation, it is same as that of FIG. 2. Therefore, its detailed explanation is omitted.

It is to be understood that though these embodiments have been described in respect of the motor for driving the focusing lens unit, the device of the invention may be applied to the motor for varying the size of aperture opening of a diaphragm for determining an F-number.

As has been described above, according to the invention, the field-effect transistor that never lowers its accuracy with an increase in the number of times the changing-over operation between the manual and motor-driven modes repeats, and that consumes a much smaller amount of electric power even when the changing-over operation is carried out, is used plurally for changeover. Therefore, increased reliability of the changing-over operation between the manual and motor-driven modes is assured and the consumption of electric power in each cycle of changing-over operation is reduced. Further, it becomes possible to achieve a reduction of cost.

What is claimed is:

1. A control device for a motor, comprising:
   means to be driven by said motor;
   first signal generating means for producing a drive signal for driving said motor;
   second signal generating means for producing a changeover signal for changing over between the supply and interruption of said drive signal to said motor;
   a first field-effect transistor, said drive signal produced by said first signal generating means being inputted to a drain terminal of said first field-effect transistor, a signal related to said changeover signal being inputted to its gate terminal, and its source terminal being connected to said motor; and
   a second field-effect transistor, a source terminal of said second field-effect transistor being connected to said motor, a signal related to said changeover signal being inputted to its gate terminal, and its drain terminal being grounded.

2. A device according to claim 1, further comprising:
   resistors each connected between the gate terminal and the source terminal of each of said two field-effect transistors.

3. A device according to claim 1, further comprising:
   other field-effect transistors connected to the respective gate terminals of said two field-effect transistors, and wherein said changeover signal is inputted to gate terminals of said other field-effect transistors.

4. A device according to claim 1, further comprising:
   a focusing lens for performing focus adjustment of a photographic optical system, and wherein said motor drives said focusing lens.

5. A device according to claim 1, further comprising:
   a diaphragm for determining an F-number of a photographic optical system, and wherein said motor drives said diaphragm so as to vary the size of aperture opening.

* * * * *